United States Patent
Fernández Acevedo et al.

(10) Patent No.: US 8,530,531 B2
(45) Date of Patent: Sep. 10, 2013

(54) METHOD FOR THE RECYCLING OF POLYVINYL BUTYRAL

(75) Inventors: Claudio Fernández Acevedo, Los Arcos (ES); Luis Martínez de Morentín Osaba, Los Arcos (ES); Edurne Osés Arteta, Los Arcos (ES); Germán Medina Herrera, Los Arcos (ES); María Antonia Fernández Fernández, Los Arcos (ES)

(73) Assignee: L'Urederra Fundacion para el Desarrollo Technologico y Social, Navarra (ES)

( * ) Notice: Subject to any disclaimer, the term of this patent is extended or adjusted under 35 U.S.C. 154(b) by 191 days.

(21) Appl. No.: 12/734,896

(22) PCT Filed: Mar. 27, 2008

(86) PCT No.: PCT/ES2008/000175
§ 371 (c)(1),
(2), (4) Date: Jun. 1, 2010

(87) PCT Pub. No.: WO2009/118426
PCT Pub. Date: Oct. 1, 2009

(65) Prior Publication Data
US 2010/0249253 A1    Sep. 30, 2010

(51) Int. Cl.
*C08J 11/04*        (2006.01)
(52) U.S. Cl.
USPC ............. 521/40; 521/40.5; 521/47; 528/480; 528/482; 528/488; 528/489; 528/491; 428/437
(58) Field of Classification Search
CPC ............................ C08J 11/09; C08J 2329/14
USPC ............ 521/40, 40.5, 41, 42.5, 44, 46, 46.5, 521/47, 48, 49, 49.8; 528/480, 481, 482, 528/488, 489, 491, 493, 494, 495, 496, 497, 528/498, 499, 502 R, 502 A, 502 C, 502 D, 528/502 E, 502 F, 503; 526/72, 330; 428/34.5, 428/437; 524/502, 317; 525/63, 222, 227, 525/231
See application file for complete search history.

(56) References Cited

U.S. PATENT DOCUMENTS

| | | | |
|---|---|---|---|
| 5,739,270 | A | 4/1998 | Farmer et al. |
| 2004/0229965 | A1 | 11/2004 | Maurer et al. |
| 2008/0021185 | A1* | 1/2008 | Schulte et al. ................ 526/330 |
| 2009/0209667 | A1* | 8/2009 | Thompson et al. ............ 521/47 |
| 2010/0206005 | A1 | 8/2010 | Hori et al. |

FOREIGN PATENT DOCUMENTS

| | | |
|---|---|---|
| EP | 0 567 876 | 11/1993 |
| JP | 2001-334248 | 12/2001 |
| JP | 2007-284648 | 11/2007 |
| WO | 97/05194 | 2/1997 |
| WO | WO 2005012377 A1 * | 2/2005 |
| WO | 2007-032501 | 3/2007 |

OTHER PUBLICATIONS

International Search Report issued Jun. 30, 2008 in International (PCT) Application No. PCT/ES2008/000175.
Supplementary European Search Report issued Aug. 5, 2011 in corresponding European Application No. 08 75 0410.

* cited by examiner

*Primary Examiner* — Frances Tischler
(74) *Attorney, Agent, or Firm* — Wenderoth, Lind & Ponack, L.L.P.

(57) ABSTRACT

Method for the recycling of polyvinyl butyral based on obtaining recycled polyvinyl butyral (PVB) from laminated glass which is shattered and the polyvinyl butyral (PVB) is separated. The sheet obtained is cut into pieces and cleaned to eliminate dirt and foreign matter. The solid state PVB is subjected to a first polyvinyl butyral (PVB) purification stage with a chemical treatment with a first reagent and a final chemical treatment with a second reagent. The obtained purified polyvinyl butyral is suitable to be used in the manufacture of laminated glass.

4 Claims, 4 Drawing Sheets

METHOD FOR THE RECYCLING OF POLYVINYL BUTYRAL

This application is a U.S. national stage of International Application No. PCT/ES2008/000175 filed Mar. 27, 2008.

OBJECT OF THE INVENTION

The following invention relates, as stated in the title of this specification, to a method for the recycling of polyvinyl butyral (PVB), the object of the method is to obtain highly pure recycled polyvinyl butyral (PVB) from laminated glass for the reutilization thereof in laminated glass.

FIELD OF APPLICATION

This specification describes a method for the recycling of polyvinyl butyral (PVB), which is applicable in the glass industry, more specifically in the manufacture of laminated glass use particularly in automobiles and in construction.

BACKGROUND OF THE INVENTION

As it is known, laminated glass consists of two or more layers of glass; between them one or more layers of polyvinyl butyral (PVB) are sandwiched. Such that for laminated glass first-use polyvinyl butyral (PVB) is used as the layer in between due to its excellent features: great adherence to glass, high impact strength, high flexibility, excellent optical clarity, high stability (especially against ultraviolet rays), thermal stability or insensitivity to moisture. In turn, one must add a good thermoplastic output, which means that polyvinyl butyral (PVB) has been produced in major commercial quantities since the 1940's.

In contrast with all the aforementioned virtues, the manufacture of polyvinyl butyral (PVB) is expensive (6€-9 €/kilo), therefore recycling is a technique which can provide this product with a high degree of added value, up to date no method have been previously developed that could produce a product pure enough to be reused as layer in laminated glass.

Therefore, the material disposed is being buried or incinerated, causing a tremendous impact on the environment as a result of the air pollution generated.

Throughout history, different unsuccessful attempts have been made to achieve polyvinyl butyral (PVB) recycling. Thus, for example, several glass recycling plants in Germany are capable of separating the glass from the polyvinyl butyral (PVB), however this polyvinyl butyral (PVB) is unfortunately not suitable for reuse due to the high content of rubber and glass fractions.

A German institute in Thüringen leaded a research study on the purification of polyvinyl butyral (PVB) from vehicle windshield glass some years ago in which different purification methods were used on pieces of raw polyvinyl butyral (PVB) contaminated with all types of impurities.

Flotation separation and different melt filtering methods resulted in a purer material, but there continued to be a large quantity of contaminating particles such as rubber and glass, causing the quality of the resulting material not to be sufficiently acceptable for its reuse in different types of applications.

The effort made up to date for the recycling of polyvinyl butyral (PVB) obtained from End of Life Vehicles (ELVs) has been tremendous, but the technologies employed have not achieved a plastic which is purified to a high enough degree.

Up to date, solely lower-quality applications such as wall tiles, acoustic insulation, asphalt mixes, etc. have been found for making good use of recycled polyvinyl butyral (PVB).

These applications must be assessed as a poor substitute for the reuse of laminated glass in terms of equivalent value. The development of additional, high-value applications for the polyvinyl butyral (PVB) recovered from laminated glass, stemming from a higher quality of the resulting product, many boost the economic feasibility of recycling this material, achieving, in turn, some major benefits at the environmental level.

The most highly advanced polyvinyl butyral (PVB) recycling processes are currently:

Dry separation process of Societá per L'Elettronica Applicata (SEA), Villanova (Bologne) Italy.

As an alternative to the conventional methods, this process introduces a separation of the polyvinyl butyral (PVB) from glass consisting of a dry filtering in melted state based on the different physical properties of these two materials combined with an ultrasound gravitational separation method.

Flotation separation using fluid of a density >1.0 g/cm3 of Thueringisches Institut fur Kunstoff-Forschung eV (TITK), Rodulstadt, Germany.

The current recycling methods set out by the company TITK (Rudolstadt, Germany) and based on a pilot polyvinyl butyral (PVB) and glass separation line are structured as follows:

The method starts with a first separation stage, in which techniques based on the fragility differential between these two materials are employed. By passing the windshields through three rollers, the layer of glass will be shattered and the remaining flexible plastic will remain in a whole sheet, to then be put through the flotation separation line, which is comprised the following stages:

Stage 1: A fluid with a density of 1.0 g/ml is used for eliminate the polyolefins (Polypropylene and Polyethylene), as well as the dust and grime incrusted on the surface.

Stage 2: In this second stage, the polyvinyl butyral (PVB) effluent still contaminated with glass, rubber, etc. is placed in water containing $Na_2SO_4$ (d=1.1 g/ml), thus achieving two flows:

PVB+Na2SO4

PVB+(PA, PET, Glass, Rubber, etc).

Stage 3: This last stage revolves round the separation of the (PVB) and $Na_2SO_4$ by way of water flotation, obtaining a more highly pure flow (PVB).

These techniques do not achieve a degree of purity high enough for the reuse thereof as polyvinyl butyral (PVB) sheets for manufacturing laminated glass, therefore being necessary to be considered other techniques.

The recent advances in separation techniques have transformed the field under study, such as, for example, the selective flocculation separation systems, being possible to develop systems which, barely ten years ago, would have been thought to be impossible for industrial-level separation.

These methods have now already been successfully applied in the separation of contaminants from silicone but up to date have never been used for eliminating the contaminants from polyvinyl butyral (PVB).

There are currently patents related to the recycling of polyvinyl butyral (PVB), being possible to mention those in following:

DE 19509244 held by BUNA SOW LEUNA OLEFIN-VERB GmbH, in which a method is described for the recovery of polyvinyl butyral from laminated glass preventing the physical and chemical breakdown thereof, for which the polyvinyl butyral (PVB) is melted down and the residual impurities are removed by means of separation of the two thereof and then reinserting into the process.

DE 19811199 held by VIDEO COMPUTER RECYCLING, in which a method is described for the recovery of polyvinyl butyral from safety glass and process equipment, in which the polyvinyl butyral (PVB) undergoes purification, but using autoclaves, high temperatures, inert gases, among others, such that the (PVB) is melted down, and treatments are then carried out for obtaining the pure, solid (PVB).

DE 10301738 held by VIGOR GmbH VIDEO COMP RECYCLIN, in which a method is described for recovering polyvinyl butyral from laminated safety glass which entails placing in water containing a metal alcoholate catalyst and with a free additive in water prior to the drying and granulating thereof, based on a (PVB) purification by means of an high-temperature agitation treatment with a metal alcoholate as the catalyst.

To complete the description provided hereinbelow and for the purpose of aiding toward a better comprehension of the characteristics of this invention, a set of drawings is furnished along with this specification, in the figures of which, the most characteristic details of the invention are shown for illustrative yet non-limiting purposes.

DESCRIPTION OF THE INVENTION

Figure 1:
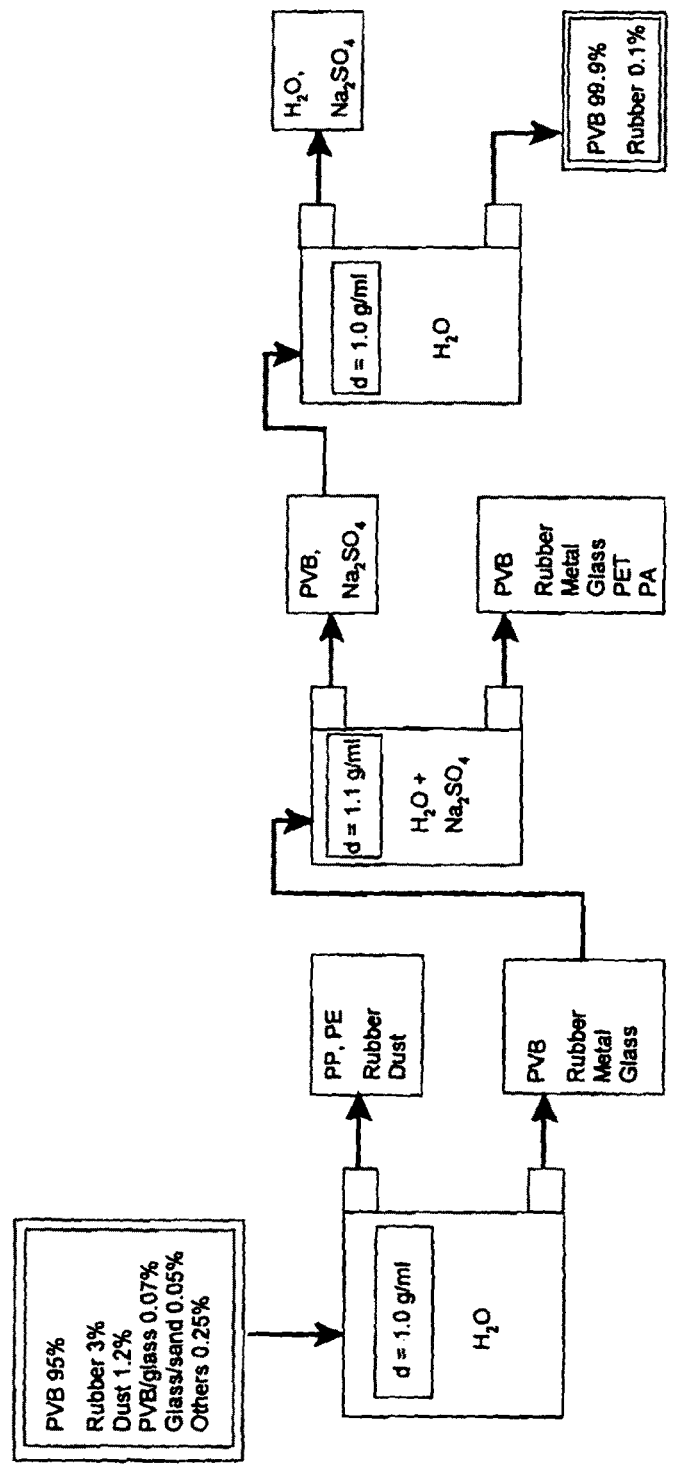
FIG. 1. Shows a diagram of a laminated glass recycling process for obtaining polyvinyl butyral by employing a flotation separation process.

The diagram relating to FIG. 1 of the drawings shows the recycling of polyvinyl butyral (PVB) by a flotation process, such that, as previously stated hereinabove, the materials are first separated employing techniques based on the fragility differential between these two materials, that is to say, the glass and the polyvinyl butyral, the laminated glass to be recycled is then passed through three rollers, shattering the glass layer and the flexible plastic layer remaining in a whole sheet.

Afterward, the flexible plastic is placed on the flotation separation line, which is comprised of the following stages:
  use of a fluid of density 1.0 g/ml for eliminating the polyolefins (Polypropylene and Polyethylene), as well as the dust and grime incrusted on the surface
  next, the polyvinyl butyral (PVB) effluent still contaminated with glass, rubber, etc. is placed into water containing $Na_2SO_4$ (d=1.1 g/ml).
  Obtaining two flows:
    PVB+$Na_2SO_4$
    PVB+(PA, PET, Glass, Rubber, etc).
  lastly, the (PVB) and $Na_2SO_4$ are then separated by way of flotation in water, obtaining one flow of H2O and $Na_2SO_4$ and another of higher-purity (PVB).

The purity which is achieved with these techniques does not suffice for their reuse as polyvinyl butyral (PVB) sheets for manufacturing laminated glass.

Figure 2:
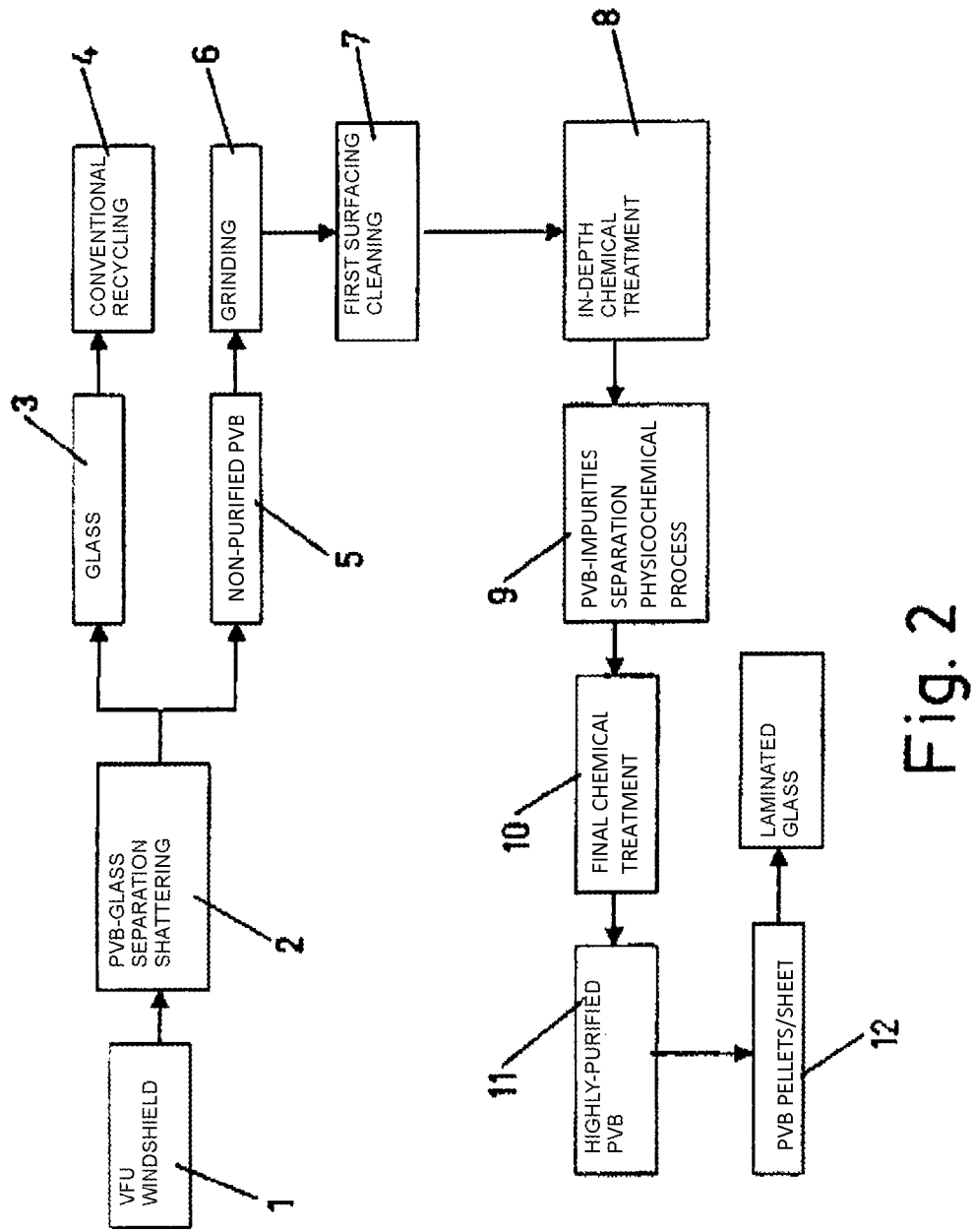
FIG. 2. Shows a diagram of the laminated glass recycling process for obtaining polyvinyl butyral according to this invention.

For the purpose of providing a solution to these drawbacks in this specification, as shown in the diagram in FIG. 2 of the drawings, a laminated glass recycling process is described based mainly on the innovativeness in the polyvinyl butyral (PVB) purification process.

The polyvinyl butyral (PVB) is prepared, using conventional processes, for the complete purification process. These processes which are commonly used are those including separation, cutting and cleaning to attain a contaminated PVB ready for complete purification. These processes according to FIG. 2 are those numbered from 1 to 7.

Next, and as the process to be patented, an in-depth cleaning process is then carried out with the purpose of achieving the complete purification of the PVB. The cleaning key process is carried out by means of a chemical treatment 8 with which the existing bonds between the polyvinyl butyral (PVB) and the small-sized glass chemically adhered to the PVB are chemically weakened.

These bonds are developed during the laminated glass manufacturing process due to the processing thereof with temperature, pressure, etc. and are normally difficult to break down. During this chemical reaction using specific reagents, the existing bonds between the glass residue and the polyvinyl butyral (PVB) are broken down.

Special mention must be made on the fact that, during this treatment, the PVB is in solid state, something which had not be achieved until now due to the purification processes currently being carried out with the polyvinyl butyral (PVB) in solution.

To carry out this type of reactions, different reagents can be used to make it possible to weaken the existing bonds between these two materials, one of which is shown in the example provided at a further point herein.

Afterward, followed by the weakening of the chemical bonding forces between the polyvinyl butyral (PVB) and the glass, a physical-chemical flocculation or process or another of similar results 9 is then carried out to eliminate the possible glass impurities physically adhered to the polyvinyl butyral (PVB). This type of processes is commonly used in nowadays industry, especially at companies in the plastic recycling sector.

Lastly, and as a final step in the purification process, the polyvinyl butyral (PVB) then undergoes a final chemical treatment 10. This treatment is supplementary to chemical treatment 8 and serves to assure that the purified polyvinyl butyral (PVB) possesses the structures and properties inherent to pure polyvinyl butyral (PVB).

The reagent used in the first purification stage 8 is an acid or equivalent compound.

On the other hand, the reagent used in the final purification stage 10 is a base or equivalent compound.

Once each one of both the chemical as well as the physicochemical treatments has been carried out, the polyvinyl butyral (PVB) can then be cleaned with water or with any other medium for eliminating the possible traces which may remain on the surface of the PVB resulting from each treatment. Obtaining, following the last cleaning process, a recycled polyvinyl butyral (PVB) 11 with a high degree of purity, which is especially important for the subsequent manufactured of laminated glass 13 using the mentioned polyvinyl butyral (PVB).

The method comprising the object of this invention may be carried out in melted or near-melted state in accordance with that which is described in the first claim.

Apart from the above, the cleaning method can be carried out on the PVB in small sections following a prior cutting process or on the whole PVB sheet without any need of a prior process of cutting it into pieces.

EXAMPLE I

As an example, the chemical purification treatment of the PVB obtained following the conventional extraction processes is then carried out. The PVB is chemically treated using a reagent which achieves the weakening of the bonds between the PVB and the glass, an example of which is different organic acids such as glacial acetic acid, etc. The reaction conditions and parameters to be assured according to the example would be as follows:

Reaction temperature: 60° C.
Reagent: 50% glacial acetic acid in water
PVB and reagent percentage: 4% PVB in the reagent
Reaction time: 10 minutes
Agitation: 500 r.p.m.

The polyvinyl butyral (PVB) is then cleaned with water to ensure the complete removal of all possible remaining reagent on the surface of the material.

Next, the separation of the polyvinyl butyral (PVB) from the impurities is carried out by means of a physicochemical process by way of flocculation to weaken to glass physically adhered to the polyvinyl butyral (PVB), observing conventional conditions of cleanliness during this treatment.

Lastly, by means of a further chemical treatment to ensure that the polyvinyl butyral (PVB) possesses the original structure and properties, the chemical treatment is carried out using compounds with basic characteristics, for example, Sodium Hydroxide. To carry out the treatment as per example, the following reaction conditions are required:

Reaction temperature: 50° C.
Reagent: base solution
PVB and reagent percentage: 10% PVB in the reagent
Reaction time: 7 minutes
Agitation: 500 r.p.m.

The polyvinyl butyral (PVB) is then cleaned with water to ensure the complete removal of any possible remaining reagent on the surface of the material, achieving a polyvinyl butyral (PVB) ready for use in laminated glass.

Figure 4:
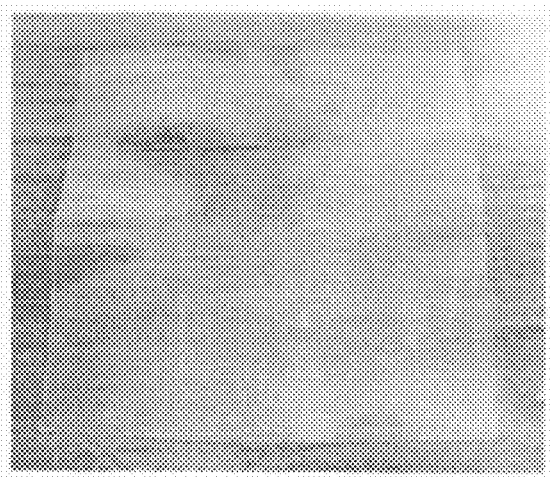
FIG. 4. Sample of a sheet of recycled PVB.

A sample of a sheet of recycled PVB is shown in FIG. 4.

Figure 3:
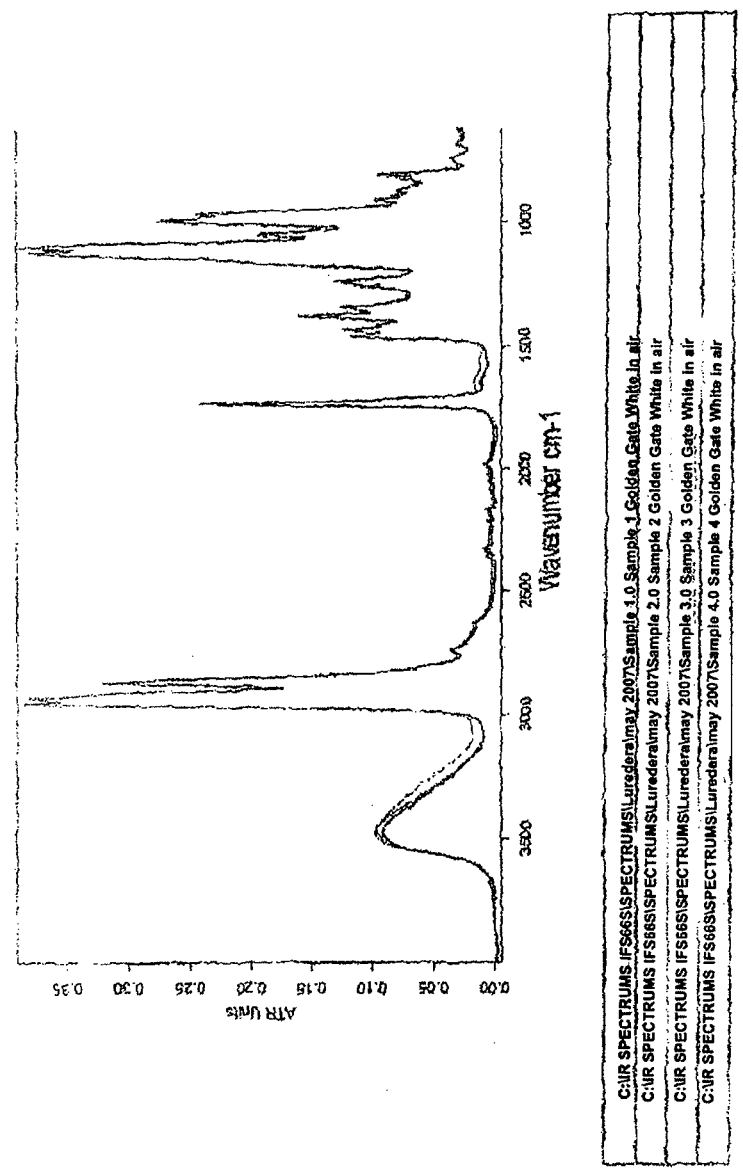
FIG. 3. Shows an infrared spectrum where similar results are found both for commercial PVB samples and for the recycled PVB sample.

One of the results achieved during the characterization of the recycled polyvinyl butyral (PVB) is shown in FIG. 3, where an infrared spectrum of the recycled PVB material as compared to commercial PVB is shown, similar results having been found for all of the samples.

The invention claimed is:

1. A method for recycling of polyvinyl butyral (PVB), comprising:
   providing a solid state PVB which was obtained from laminated glass and cut into pieces, wherein the solid state PVB has glass chemically adhered to the PVB;
   subjecting the solid state PVB to a first polyvinyl butyral purification stage comprising chemical treatment with an acid to obtain a purified solid state PVB; and
   then subjecting the purified solid state PVB to a final chemical treatment stage comprising chemical treatment with a base to obtain a treated purified solid state PVB;
   wherein the treated purified solid state PVB is substantially free of the glass, is recycled and is suitable for manufacture of laminated glass.

2. The method for recycling of polyvinyl butryl according to claim 1, wherein the acid is acetic acid.

3. A method for recycling of polyvinyl butyral (PVB), comprising:
   providing a solid state PVB which was obtained from laminated glass, wherein the solid state PVB has glass chemically adhered to the PVB;
   subjecting the solid state PVB to a first polyvinyl butyral purification stage comprising chemical treatment with an acid to obtain a purified solid state PVB; and
   then subjecting the purified solid state PVB to a final chemical treatment stage comprising chemical treatment with a base to obtain a treated purified solid state PVB;
   wherein the treated purified solid state PVB is substantially free of the glass, is recycled and is suitable for manufacture of laminated glass.

4. The method for recycling polyvinyl butyral according to claim 3, wherein the acid is acetic acid.

* * * * *